United States Patent [19]

O'Quinn et al.

[11] Patent Number: 5,124,199
[45] Date of Patent: Jun. 23, 1992

[54] CURED COATED COMPOSITES AND THEIR PRODUCTION

[75] Inventors: Alethea H. O'Quinn; Sharon M. Onorato, both of Baton Rouge; Jules A. Lambert, Denham Springs, all of La.

[73] Assignee: Ethyl Corporation, Richmond, Va.

[21] Appl. No.: 673,723

[22] Filed: Mar. 22, 1991

Related U.S. Application Data

[62] Division of Ser. No. 309,370, Feb. 13, 1989.

[51] Int. Cl.$^5$ .................. B32B 27/08; B32B 27/12; B32B 33/00
[52] U.S. Cl. .................. 428/287; 156/246; 156/278; 156/289; 156/307.1; 156/313; 428/288; 428/473.5; 428/908.8
[58] Field of Search .............. 428/473.5, 287, 288, 428/908.8; 156/246, 278, 289, 307.1, 313

[56] References Cited

U.S. PATENT DOCUMENTS

| | | | |
|---|---|---|---|
| 3,356,648 | 12/1967 | Rogers | 260/47 |
| 3,849,226 | 11/1974 | Butz | 156/247 |
| 3,959,350 | 5/1976 | Rogers | 260/47 C |
| 4,913,759 | 4/1990 | Wright | 156/238 |

*Primary Examiner*—James C. Cannon
*Attorney, Agent, or Firm*—Richard L. Hansen; Richard J. Hammond

[57] ABSTRACT

A self-supporting film of a curable fluorine-containing aromatic polyimide precursor resin is applied to and cured at elevated temperature and pressure on one or more outer surfaces of a reinforced substrate. The substrate is (1) a prepreg lay-up of (a) reinforced plies of a curable aromatic polyimide precursor or (b) fibers impregnated with a cured polyimide powder, or (2) a composite previously formed by curing a lay-up of a reinforced plies of a curable aromatic polyimide precursor. The resultant cured coating improves the erosion resistance of the composites so formed. Use of such films avoids the difficulties experienced when using conventional spray coating procedures.

9 Claims, No Drawings

CURED COATED COMPOSITES AND THEIR PRODUCTION

This application is a division of U.S. application Ser. No. 07/309,370, filed Feb. 13, 1989.

TECHNICAL FIELD

This invention pertains to novel structural materials and their production. More particularly, coated composite materials of enhanced erosion resistance formed by a simple and highly efficient curing process form the subject matter to which this invention relates.

BACKGROUND

In order to improve the erosion resistance of composites formed from certain polyimides such as PMR-15 resin, a spray coating procedure has been utilized using dilute solutions of a polyamic acid made from substantially equimolar quantities of pyromellitic dianhydride and 2,2-bis-[4-(4-aminophenoxy)phenyl]hexafluoropropane. While workable, this procedure is fraught with operational difficulties. In particular, numerous passes and thermal processing steps are required in the spraying operations in order to build up the coating to the desired thickness. Also, spraying of flammable chemical solutions requires the exercise of care from the safety standpoint, and can involve environmental considerations.

THE INVENTION

This invention avoids all of the foregoing difficulties and provides a highly efficient method for producing coated composites which possess improved physical properties, especially enhanced erosion resistance.

In accordance with one embodiment of this invention, a self-supporting film of a fluorine-containing aromatic polyimide precursor is applied to at least one outer surface of a prepreg lay-up of (a) reinforced plies of a curable aromatic polyimide precursor or (b) fibers impregnated with a cured polyimide powder, and the resultant coated prepreg is cured by application of suitable elevated temperature and pressure conditions. In accordance with another embodiment of this invention, a self-supporting film of a fluorine-containing aromatic polyimide precursor is applied to at least one outer surface of a composite previously formed by curing a lay-up of a reinforced plies of a curable aromatic polyimide precursor, and the so-applied film is cured in contact with the composite by application of suitable elevated temperature and pressure conditions. In all of the foregoing embodiments the self-supporting film which is applied to the reinforced substrate is thermally curable into a fluorine-containing aromatic polyimide.

The prepregs are preferably formed from a plurality of adjacently-positioned unidirectional continuous fibers or a woven fibrous mat or cloth which in either case is impregnated with a cured polyimide powder or, preferably, a curable aromatic polyimide precursor. The fibers, whether unidirectionally aligned or used in the form of a woven cloth, may be glass fibers, carbon fibers, ceramic fibers such as aluminum nitride or boron nitride, metallized fibers, and the like. The fibers may be treated with a sizing agent or they may be unsized. As noted above, the curable self-supporting film is applied either to (i) the prepreg lay-up before it is cured, whereby the coating and the prepreg are co-cured in the process, or (ii) to a composite previously-formed from such a lay-up, whereby in the process the coating is cured onto the composite. In either such case, the makeup of the lay-ups used may be the same.

A wide variety of curable aromatic polyimide precursors may be used in impregnating the fibers to form the prepreg sheets or tapes. These include (i) polyamic acids formed from one or more primary aromatic polyamines, preferably aromatic diamines, and one or more aromatic tetracarboxylic acid dianhydrides; (ii) polyamide esters formed from one or more primary aromatic polyamines, preferably aromatic diamines, and one or more half esters of an aromatic tetracarboxylic acid; (iii) polyamide-imides which in effect are partially cured resins formed from (i) or (ii); and (iv) mixtures of monomers which are curable into polyimides, such as substantially equimolar mixtures of one or more primary aromatic polyamines, preferably aromatic diamines, and one or more esters, preferably a half ester, of an aromatic tetracarboxylic acid; and any mixture of two or more of (i), (ii), (iii) and (iv). The curable polyimide precursors may contain suitable end-capping agents, such as phthalic anhydride, nadic anhydride or the like. The nature and makeup of curable aromatic polyimide precursors are well known to those skilled in the art and many references thereto may be found in the literature. Most preferably, the precursor is or contains partially imidized aromatic polyimide precursor.

In general, the aromatic tetracarboxylic acid dianhydrides which may be used in forming suitable precursors can be represented by the formula

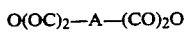

$$O(OC)_2-A-(CO)_2O$$

wherein A is an aromatic group. Illustrative compounds of this type include
pyromellitic dianhydride
3,3',4,4'-benzophenonetetracarboxylic acid dianhydride
4,4'-oxydiphthalic acid dianhydride
2,3,6,7-naphthalenetetracarboxylic acid dianhydride
1,2,5,6-naphthalenetetracarboxylic acid dianhydride
2,2-bis(3,4-dicarboxyphenyl)propane dianhydride
2,2-bis(3,4-dicarboxyphenyl)hexafluoropropane dianhydride
1,1-bis(3,4-dicarboxyphenyl)ethane dianhydride
bis(3,4-dicarboxyphenyl)methane dianhydride
3,4,9,10-perylenetetracarboxylic acid dianhydride
and the like, including mixtures of two or more such dianhydrides. Pyromellitic acid dianhydride and 3,3',4,4'-benzophenonetetracarboxylic acid dianhydride are particularly preferred reactants for producing the aromatic polyamic acid polyimide precursors.

Esterification of such dianhydrides with lower alcohols such as $C_1$ to $C_4$ alkanols results in the formation of aromatic tetracarboxylic acid esters which may be used as precursors either (i) in admixture with a substantially equimolar quantity of one or more aromatic polyamines, preferably diamines, or (ii) after such mixture has been reacted to produce a curable polyamide ester resin or polyimide-amide resin.

The aromatic polyamines used in producing the aromatic polyimide precursors are generally one or more aromatic or heterocyclic primary diamines represented by the formula

$$H_2N-A-NH_2$$

wherein A is an aromatic group. Illustrative compounds of this type include p-phenylenediamine
m-phenylenediamine
4,4'-diaminobiphenyl
3,3'-diaminobiphenyl
4,4'-methylenedianiline
4,4'-diaminodiphenylsulfide
3,3'-diaminodiphenylsulfide
4,4'-diaminodiphenylsulfone
3,3'-diaminodiphenylsulfone
4,4'-diaminodiphenylketone
3,3'-diaminodiphenylketone
4,4'-oxydianiline
3,3'-oxydianiline
1,4-diaminonaphthalene
2,6-diaminopyridine
3,5-diaminopyridine
2,6-diaminotoluene
2,4-diaminotoluene
1,1-bis(3-aminophenyl)ethane
2,2-bis(4-aminophenyl)propane
and the like.

When forming the curable precursor resins, it is customary to dissolve the aromatic tetracarboxylic dianhydride or diester (preferably a half ester) and the aromatic primary diamine reactants in approximately equimolar proportions in a suitable solvent and neat the solution to a temperature of up to about 120° C., to cause the formation of a solution of the polyamic acid or polyamide ester resin of suitable solids content (i.e., concentration of dissolved polyamic acid). The preferred solvents for this purpose are dipolar aprotic solvents such as N-methylpyrrolidone, N,N-dimethylformamide, N,N-dimethylacetamide, dimethylsulfoxide, sulfolane, etc., although other solvents such as cresol, diglyme, methylisobutylketone, etc., may be employed, either alone or preferably in combination with a dipolar aprotic solvent. Controlled heating to somewhat higher temperatures enables the formation of other curable polyimide precursors such as the polyamide-imides.

It should be abundantly clear from the foregoing that any aromatic polyimide precursor that can be thermally cured to a polyimide is suitable for forming the prepregs used in forming the layups to be coated pursuant to this invention.

A number of prepreg materials suitable for use in the practice of this invention are available as articles of commerce. These include PMR-15 resin (formed from 3,3',4,4'-benzophenonetetracarboxylic acid dilower alkyl ester, 4,4'-methylenedianiline and nadic anhydride), Avimid N (formed from 2,2-bis(3,4-dicarboxyphenyl)hexafluoropropane dianhydride and a 95/5 mixture of p-phenylene diamine and m-phenylene diamine, and the like.

In the embodiments of this invention where a previously formed cured composite is used as the substrate for the coating, a prepreg lay-up of the type described above is formed and cured before applying and curing the self-supporting film thereon. In the embodiments of this invention where the substrate for the coating is a lay-up of reinforcing fibers impregnated with a polyimide powder, the polyimide powder may be formed from the reactants described above in connection with the curable aromatic polyimide precursors. The powders are often formed by adding a non-solvent to a solution of the polyimide whereby a precipitate of polyimide powder is formed. Methods suitable for forming such powders are reported in the literature.

While a number of procedures may be used for producing the self-supporting film of a fluorine-containing aromatic polyimide precursor, a two-stage procedure has been found highly efficacious and is, therefore, preferred. In the first stage, a solution of a fluorine-containing aromatic polyimide precursor is formed and in the second stage, the solution is used in producing a self-supporting film of a polyimide precursor resin.

In the first stage of the preferred procedure, a fluorine-containing polyimide precursor is produced in the same way as the above-described procedure for forming the polyimide precursors used in forming the substrates, with the qualification that (i) a fluorine-containing aromatic tetracarboxylic acid dianhydride or (ii) a fluorine-containing aromatic primary polyamine (preferably a diamine), or a combination of (i) and (ii) is used in the synthesis of the fluorine-containing polyimide precursor. Preferred fluorine-containing aromatic tetracarboxylic acid dianhydrides that may be employed include 2,2-bis(3,4-dicarboxyphenyl)hexafluoropropane dianhydride and 2,2-bis[4-(3,4-dicarboxyphenoxy)phenyl]-hexafluoropropane dianhydride. Preferred fluorine-containing aromatic primary diamines include
2,2-bis(3-aminophenyl)hexafluoropropane
2,2-bis(4-aminophenyl)hexafluoropropane
2,2-bis[4-(3-aminophenoxy)phenyl]hexafluoropropane
2,2-bis[4-(4-aminophenoxy)phenyl]hexafluoropropane
and the like.

The fluorine-containing aromatic polyamic acids are preferably based on use of either (i) a fluorine-containing aromatic tetracarboxylic acid dianhydride as the predominant, and most preferably as the sole, tetracarboxylic acid dianhydride constituent of the polyamic acid resin, or (ii) a fluorine-containing aromatic primary polyamine (preferably a diamine) as the predominant, and most preferably as the sole, fluorine-containing aromatic primary polyamine constituent of the polyamic acid resin. When a fluorine-containing aromatic tetracarboxylic acid dianhydride is the predominant, and most preferably, the sole aromatic tetracarboxylic acid dianhydride used in forming the polyamic acid resin, the aromatic polyamine may be (a) a fluorine-free aromatic primary polyamine of the type referred to hereinabove, (b) a fluorine-containing aromatic primary polyamine of the type referred to hereinabove, or (c) a combination of (a) and (b) in any proportions relative to each other ranging from a trace of (a) with the balance being (b), to a trace of (b) with the balance being (a). Likewise, when a fluorine-containing aromatic primary polyamine is the predominant, and most preferably, the sole aromatic fluorine-containing aromatic primary polyamine used in forming the polyamic acid resin, the aromatic tetracarboxylic acid dianhydride may be (a) a fluorine-free aromatic tetracarboxylic acid dianhydride of the type referred to hereinabove, (b) a fluorine-containing aromatic tetracarboxylic acid dianhydride of the type referred to hereinabove, or (c) a combination of (a) and (b) in any proportions relative to each other ranging from a trace of (a) with the balance being (b), to a trace of (b) with the balance being (a). In all cases, the reaction mixture should contain an approximately equimolar mixture of the tetracarboxylic acid dianhydride(s) and the polyamine(s). Among the particularly preferred polyamic acids are those formed from pyromellitic acid dianhydride, 3,3',4,4'-benzophenonetetracarboxylic acid dianhydride, and/or 2,2-bis(3,4-dicarboxyphenyl)-hexafluoropropane dianhydride as the sole aromatic tetracarboxylic acid dianhydride(s), and 2,2-bis[4-(3- aminophenoxy)phenyl]hexafluoropropane and/or 2,2-bis[4-(4-aminophenoxy)phenyl]hexafluoropropane as the sole aromatic polyamine(s).

In the synthesis of fluorine-containing aromatic polyamic acids, the reactants are heated to a suitable temperature which is usually below about 100° C., e.g., about 80° to about 90° C., while dissolved in a suitable solvent, preferably a dipolar aprotic solvent of the type referred to hereinabove. The concentration of the polyamic acid solution resulting from the process will preferably be at least 10% by weight (usually referred to as "solids content").

In the second stage the polyamic acid solution is applied to a smooth non-adherent horizontal surface such as a glass plate and the system is heated to a temperature in the range of about 100° to about 160° C. and under reduced pressure over a suitable time period to remove a portion of the solvent and form a solid self-supporting polyimide precursor film of suitable thickness. By use of suitably low boiling solvents the self-supporting films may be formed at atmospheric pressure at similar temperatures within this range. It will be appreciated that some imidization is permissible in this operation so long as the polymer remains thermally curable into a film which tenaciously bonds to the substrate.

The thickness of the polyamic acid films may vary in accordance with the type of service to which the finished coated composite will be subjected. Films falling within the range of about 1 to about 15 mils, and preferably in the range of about 3 to about 10 mils, will ordinarily be employed, but curable films of other thicknesses may be used if desired.

In forming the coating on the polyimide composite, one or a plurality of plies of the fluorine-containing polyamic acid film is/are placed on at least one outer surface of the substrate (e.g., a prepreg lay-up or a preformed composite formed from an aromatic polyimide) in a suitably shaped mold. Thereupon the resultant coated lay-up or coated composite is compressed within the mold while heated to a suitable elevated temperature in the range of about 200° to about 450° C. The compression pressure applied will vary from case to case, but generally falls within the range of about 200 to about 3000 psi. The heating and compression of the composite may be staged such that the initial temperature and pressure are relatively low and thereafter the temperature or the pressure or both is/are increased in stages to a final set of temperature-pressure conditions. Usually the composite is subjected to compression and heating over a period of at least 30 minutes up to several hours, but here again this is a matter within the judgment and control of the operator, and the conditions used will of course be sufficient to achieve the desired results. Although not necessary, the resultant coated composite article may be subjected to post-curing under appropriate elevated temperature conditions (e.g., 315° to 440° C.).

One or more plies of self-supporting fluorine-containing polyamic acid film may be applied to one or more of the six surfaces of a rectangularly-shaped lay-up. It is desirable to coat at least the surface or surfaces which in actual service will be exposed to high-temperature erosion conditions. Similar considerations apply to non-rectangularly-shaped lay-ups.

The number of plies in the lay-up is a matter of choice and will of course depend upon the size, shape, and characteristics desired in the resulting composite.

Self-supporting films of fluorine-containing aromatic polyamic acids are one preferred type of coating material for use in the practice of this invention. However as noted above, effective use can be made for this purpose of self-supporting films of other curable fluorine-containing aromatic polyimide precursors, such as polyamide esters and polyamide-imides. The polyimides formed from a curable resin made from a given set of reactants (e.g., a benzophenonetetracarboxylic acid derivative, whether the dianhydride or a half-ester thereof) and a given fluorine-containing aromatic polyamine have essentially the same final compositions and properties.

Having disclosed the basic concepts of this invention and the practice thereof, reference is now made to the following specific example which is illustrative but not limitive of this invention.

EXAMPLE

A self-supporting film of a curable fluorine-containing aromatic polyimide precursor resin was made by the following procedure: A solution of polyamic acid made from pyromellitic dianhydride and 2,2-bis[4-(4-aminophenoxy)-phenyl]hexafluoropropane in N-methylpyrrolidone (solids content of about 25 wt %) was diluted to a solids content of about 12 wt % using methylisobutylketone. The solution was spread on a horizontal smooth glass plate and held under a vacuum of 30 inches of Hg (760 mm of Hg) while slowly raising the temperature of the system to 250° F. (ca. 121° C.). The system was then held under these conditions for an additional 30 to 60 minutes. During this time the film was partially imidized, but remained curable. By weight change, the resultant film still contained about 30 wt % N-methylpyrrolidone. The resultant film was about 8 to 10 mils in thickness.

A lay-up was made from 16 plies of unidirectionally aligned carbon fibers impregnated with an aromatic polyimide precursor composed of a polyamide ester made from 3,3',4,4'-benzophenonetetracarboxylic acid dimethyl ester and 2,2-bis[4-(4-aminophenoxy)phenyl]-hexafluoropropane in N-methylpyrrolidone such that the plies of prepreg contained about 53 wt % carbon fiber, the balance being the precursor and solvent therefor.

Two plies of the above self-supporting curable film were placed on top of the prepreg lay-up in a metal mold in a press capable of appying up to 2000 psi and 600° F. (ca. 316° C.). The resulting composite was cured by closing the mold under contact pressure only, applying heat and holding the system at 115° F. (ca. 46° C.) for 45 to 60 minutes. Then the temperature was raised to 300° F. (ca. 149° C.) at the rate of about 5° F. per minute and held there for 45 to 60 minutes. Next the temperature was raised to 600° F. (ca. 316° C.) at the rate of about 4° F. per minute and while at this temperature the pressure was increased to 2000 psi and then promptly released. The pressure was again raised to 2000 psi and this time this pressure was held for one hour while keeping the temperature at 600° F. (ca. 316° C.). The heat was then turned off and the mold allowed to cool to room temperature while still applying 2000 psi pressure to the composite. Application of pressure was then discontinued and the cured composite, coated on one surface with a co-cured coating was removed from the mold.

The top (coated) and bottom (uncoated) surfaces of the composite were then individually subjected for a measured time period to a uniform controlled blast of a particulate abrasive material entrained in nitrogen in order to determine erosion rates. The erosion rate of the coated surface was significantly less than that of the uncoated surface. The uncoated surface eroded at the rate of 18.0 mg per minute whereas the coated surface exhibited an erosion rate of but 13.3 mg per minute.

The foregoing disclosure has been presented for purposes of illustration and not limitation. As can readily be appreciated by those skilled in the art, this invention is susceptible to considerable variation in its practice within the spirit and scope of the ensuing claims.

We claim:

1. A coated erosion-resistant composite article formed by
   (a) applying a self-supporting film of a curable fluorine-containing aromatic polyimide precursor resin to at least one outer surface of
      (1) a prepreg lay-up of (a) reinforced plies of a curable aromatic polyimide precursor or (b) fibers impregnated with a cured polyimide powder, or
      (2) a composite previously formed by curing a lay-up of a reinforced plies of a curable aromatic polyimide precursor, and
   (b) curing the resultant coated prepreg or composite under suitable elevated temperature and pressure conditions to secure an erosion-resistant coating thereon.

2. A composite article of claim 1 in which the fluorine-containing aromatic polyimide precursor resin of said film is composed primarily or entirely of polyamic acid formed from pyromellitic dianhydride, 3,3',4,4'-benzophenonetetracarboxylic acid dianhydride, or 2,2-bis(3,4-dicarboxyphenyl)hexafluoropropane dianhydride and 2,2-bis[4-(3-aminophenoxy)phenyl]hexafluoropropane or 2,2-bis[4-(4-aminophenoxy)phenyl]hexafluoropropane.

3. A composite article of claim 1 formed by
   (a) applying a self-supporting film of a curable fluorine-containing aromatic polyimide precursor resin to at least one outer surface of a prepreg lay-up of reinforced plies of a curable aromatic polyimide precursor, and
   (b) curing the resultant coated prepreg under suitable elevated temperature and pressure conditions to co-cure the prepreg and the film and to thereby secure an erosion-resistant coating on the resultant reinforced composite.

4. A composite article of claim 3 in which the curable aromatic polyimide precursor in said prepreg lay-up is formed primarily from pyromellitic dianhydride or 3,3',4,4'-benzophenonetetracarboxylic acid dianhydride or 2,2-bis(3,4-dicarboxyphenyl)hexafluoropropane dianhydride and one or more aromatic diamines.

5. A composite article of claim 3 in which the fluorine-containing aromatic polyimide precursor resin of said film is composed primarily or entirely of polyamic acid formed from pyromellitic dianhydride, 3,3',4,4'-benzophenonetetracarboxylic acid dianhydride, or 2,2-bis(3,4-dicarboxyphenyl)hexafluoropropane dianhydride and 2,2-bis[4-(3-aminophenoxy)phenyl]hexafluoropropane or 2,2-bis[4-(4-aminophenoxy)phenyl]hexafluoropropane.

6. A composite article of claim 3 in which the curable aromatic polyimide precursor in said prepreg lay-up is formed primarily from pyromellitic dianhydride or 3,3',4,4'-benzophenonetetracarboxylic acid dianhydride or 2,2-bis(3,4-dicarboxyphenyl)hexafluoropropane dianhydride and one or more aromatic diamines, and in which the fluorine-containing aromatic polyimide precursor resin of said film is composed primarily or entirely of polyamic acid formed from pyromellitic dianhydride, 3,3',4,4'-benzophenonetetracarboxylic acid dianhydride, or 2,2-bis(3,4-dicarboxyphenyl)hexafluoropropane dianhydride and 2,2-bis[4-(3-aminophenoxy)phenyl]hexafluoropropane or 2,2-bis[4-(4-aminophenoxy)phenyl]hexafluoropropane.

7. A composite article of claim 3 in which the polyamic acid of said film is a partially imidized pyromellitic dianhydride-2,2-bis[4-(4-aminophenoxy)phenyl]hexafluoropropane polyamic acid.

8. A composite article of claim 3 in which the continuous fiber-reinforcement in said plies of curable aromatic polyimide precursor is unidirectionally aligned carbon fiber.

9. A composite article of claim 3 in which the polyamic acid of said film is a partially imidized pyromellitic dianhydride-2,2-bis[4-(4-aminophenoxy)phenyl]hexafluoropropane polyamic acid, and in which the continuous fiber-reinforcement in said plies of curable aromatic polyimide precursor is unidirectionally aligned carbon fiber.

* * * * *